United States Patent
Sotom et al.

[19]

[11] Patent Number: 6,038,045
[45] Date of Patent: Mar. 14, 2000

[54] APPARATUS FOR ADDING AND DROPPING WAVELENGTH MULTIPLEX CHANNELS

[75] Inventors: Michel Sotom, Paris; Amaury Jourdan, Sevres; Guy Soulage, Seine; Franck Bruyere, Paris; Pierre Sansonetti, Palaiseau, all of France

[73] Assignee: Alcatel, Paris, France

[21] Appl. No.: 08/956,445

[22] Filed: Oct. 23, 1997

[30] Foreign Application Priority Data

Oct. 24, 1996 [FR] France ................................. 96 12976

[51] Int. Cl.[7] .................................................. H04J 14/02
[52] U.S. Cl. ........................................... 359/128; 359/130
[58] Field of Search ................................... 359/124, 128, 359/130; 385/24

[56] References Cited

U.S. PATENT DOCUMENTS 5,612,805  3/1997  Fevrier et al. ............................ 359/124
5,751,456  5/1998  Koonen ................................... 359/124

FOREIGN PATENT DOCUMENTS

0687085A1  12/1995  European Pat. Off. .

OTHER PUBLICATIONS

K. P. Jones et al, "Optical Wavelength Add–Drop Multiplexer in installed Submarine WDM Network", Electronics Letters, vol. 13, No. 24, Nov. 23 1995, pp. 2117–2118, XP000548194.

M. J. Chawki et al, "Evaluation of an Optical Boosted Add/Drop Multiplexer Obadm Including Circulators and Fiber Grating Filters", *Proceedings of the 21st European Conference on Optical Communication*, Sep. 17, 1995, Brussels, pp. 47–50, XP002032556.

Frowin Derr et al, "An Optical Infrastructure for Future Telecommunications Networks", *IEEE COIEEE Communications Magazine*, vol. 33, No. 11, Nov. 1995, pp. 84–88, XP000545290.

Milan Kovacevic et al, "Electronic Wavelength Translation in Optical Networks", Globecom '95, IEEE Global Telecommunications Conference, Singapore, Nov. 14–16, 1995, vol. 3 of 3, Nov. 14 1995, Institute of Electrical and Electronics Engineers, pp. 2182–2187.

K. Kitayama, "Subarrier Multiplexing Based Signaling and Access Control in Optical FDM Networks", Globecom '95, IEEE Global Telecommunications Conference, Singapore, Nov. 14–16, 1995, vol. 3 of 3, Nov. 14 1995, Institute of Electrical And Electronics Engineers, pp. 1996–2002.

*Primary Examiner*—Kinfe-Michael Negash
*Attorney, Agent, or Firm*—Sughrue, Mion, Zinn Macpeak & Seas, PLLC

[57] ABSTRACT

To perform selective dropping and adding of channels of wavelength multiplexes without interposing active elements in the main transmission path, the apparatus comprises add-and-drop modules, each of which includes at least one stop filter provided with two opposite ports. An optical switch provided with a drop outlet is provided with drop inlets and with add outlets associated with the modules, and respectively coupled to the opposite ports of the filters. For each module, the switch is organized for selectively coupling one of its drop inlets to one of its add outlets and/or to the drop outlet.

9 Claims, 3 Drawing Sheets

6,038,045

APPARATUS FOR ADDING AND DROPPING WAVELENGTH MULTIPLEX CHANNELS

The invention relates to the field of optical transmissions using wavelength multiplexes. It relates more particularly to apparatus enabling one or more channels to be selectively dropped from and/or added to such a multiplex. Such apparatus is commonly referred to as an "add-drop multiplexer".

BACKGROUND OF THE INVENTION

In transmission systems using wavelength multiplexing, a plurality of channels can be conveyed simultaneously along a common fiber, each of the channels being carried by an associated wave having a determined center wavelength and a determined bandwidth. For performing routing or directing functions, it is often necessary to drop certain channels and to modify the multiplex, e.g. so as to modify the information in one or more channels or to replace the information-carrying wavelength with another wavelength.

To solve this problem, a conventional solution consists in using a demultiplexer whose outlets are connected to a multiplexer via switching means for selectively dropping and adding one or more wavelengths of the received multiplex. Unfortunately, that solution suffers from the drawback of only being capable of operating with a multiplex formed of precisely determined wavelengths. Another drawback is that an active element, namely the switch, is inserted in the main path between the inlet and the multiplexed outlet of the apparatus. All of the signals are thus interrupted while the switch is changing state, or when the switch fails.

Other solutions exist using, for example, tunable filters or fixed filters associated with switches. All of those solutions also suffer from the drawback of inserting an active element in the main path.

OBJECTS AND SUMMARY OF THE INVENTION

An object of the invention is to remedy the drawbacks of the known solutions. More precisely, the invention provides apparatus for selectively dropping at least one of the channels of at least one wavelength multiplex from said multiplex, said apparatus including optical switching means and, for each multiplex, at least one add-and-drop module comprising:

at least one stop filter provided with first and second opposite ports and tuned to at least one of the wavelengths of the channels of the multiplex;

inlet coupling means coupled to said first port and provided with an inlet port suitable for receiving said multiplex and with a drop port, said inlet coupling means being organized to inject into the filter at least a portion of the waves received via their inlet port, and to transmit via their drop port at least a portion of the waves received from said first port; and outlet coupling means coupled to said second port and provided with an outlet port and a with an add port, said outlet coupling means being organized to inject into the filter at least a portion of the waves received via their add port, and to transmit via their outlet port at least a portion of the waves received from said second port;

and wherein said switching means are provided with at least one drop outlet and, for each module, with a drop inlet coupled to said drop port, and with an add outlet coupled to said add port, and wherein, for each module, said switching means are suitable for selectively coupling said drop inlet to said add outlet and/or to said drop outlet.

The invention may advantageously be used to transfer channels between a plurality of multiplexes. Thus, in another aspect of the invention, the switching means are suitable for selectively coupling at least one drop inlet connected to one of the modules of one of the multiplexes to at least one add outlet connected to one of the modules of another multiplex.

To make it possible both to drop information carried by one or more wavelengths and also to add information carried by the same wavelengths, said switching means are provided with at least one add inlet that can be coupled selectively to at least one add outlet.

Advantageously, at least one of the add outlets of the switch is connected to the add port of one of the modules via a wavelength converter delivering at least one wavelength contained in the stop band of the filter of said module.

The latter configuration offers the advantage of enabling information carried by a determined wavelength to be inserted into a multiplex from a signal carried by a different wavelength.

BRIEF DESCRIPTION OF THE DRAWINGS

Other aspects and advantages of the invention appear from the following description given with reference to the figures, in which.

MORE DETAILED DESCRIPTION

Figure 1:
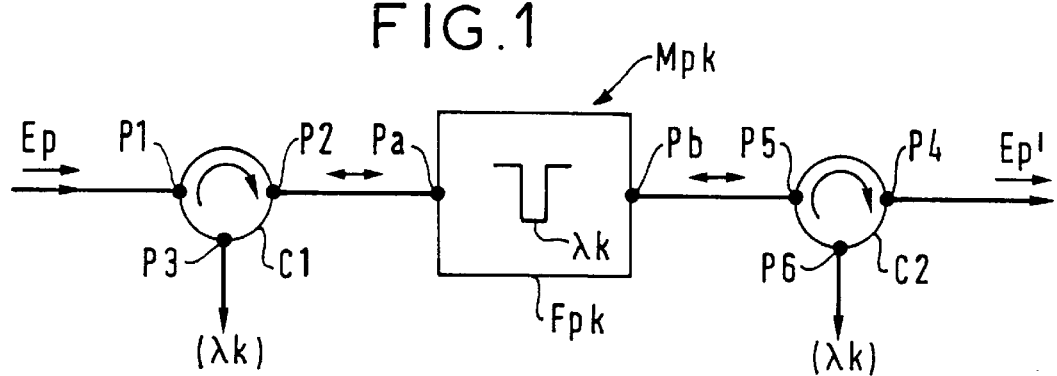
FIGS. 1 and 2 show two embodiments of add-and-drop modules that can be used in the apparatus of the invention.

FIG. 1 is an embodiment of an add/drop module Mpk that can be used to implement the invention. It is essentially constituted by a stop filter Fpk provided with two opposite ports Pa, Pb. The ports Pa and Pb are coupled respectively to inlet coupling means C1 and to outlet coupling means C2. In the example shown, the coupling means are three-port circulators. The inlet circulator C1 is provided with an inlet port P1 suitable for receiving a multiplex Ep. A second port P2 is coupled to the port Pa of the filter Fpk. A third port P3 is constituted by a drop port. The circulator C1 is disposed such as to enable the input multiplex Ep to be applied to the filter Fpk via the first port Pa, while the wave reflected by the filter Fpk and output via the same port Pa can be taken via the drop port P3.

In the same way, the outlet circulator C2 is provided with a first port P5 coupled to the filter Fpk via the second port Pb. A second port P4 of the circulator C2 makes it possible to take the wave output by the filter via the port Pb. The port P4 constitutes an outlet port enabling an output multiplex Ep' to be taken. The circulator C2 is finally provided with a third port P6 which constitutes an add port.

The filter Fpk is chosen to have a stop band centered on at least one of the wavelengths λk of the multiplex. Depending on needs, the filter may be constituted by a single element stopping a wavelength band covering the wavelength of a single channel or the wavelengths of a plurality of adjacent channels. It may also be constituted by a plurality of elements set to the wavelengths of a plurality of channels, adjacent or otherwise.

In operation, an input multiplex Ep is applied via the inlet port P1. The multiplex channels Ep carried by the wavelengths stopped by the filter are dropped from the output multiplex Ep', and can be accessed via the drop port P3. Furthermore, by injecting new channels carried by the same wavelengths via the add port P6, these new channels are added to the output multiplex Ep'.

Figure 2:
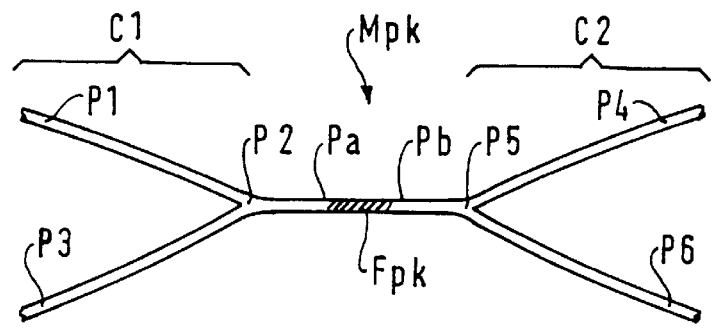

FIG. 2 shows a variant embodiment of the module Mpk using a wavelength-selective coupler. It is essentially constituted by an optical coupler whose coupling region is provided with a photo-inscribed Bragg grating that is designed to have a desired stop band. The operating principle of this apparatus is analogous to that of the FIG. 1 apparatus. A detailed description of a wavelength-selective coupler is given in French Patent Application FR-A-2725529 filed under No. 9412112.

Figure 3:
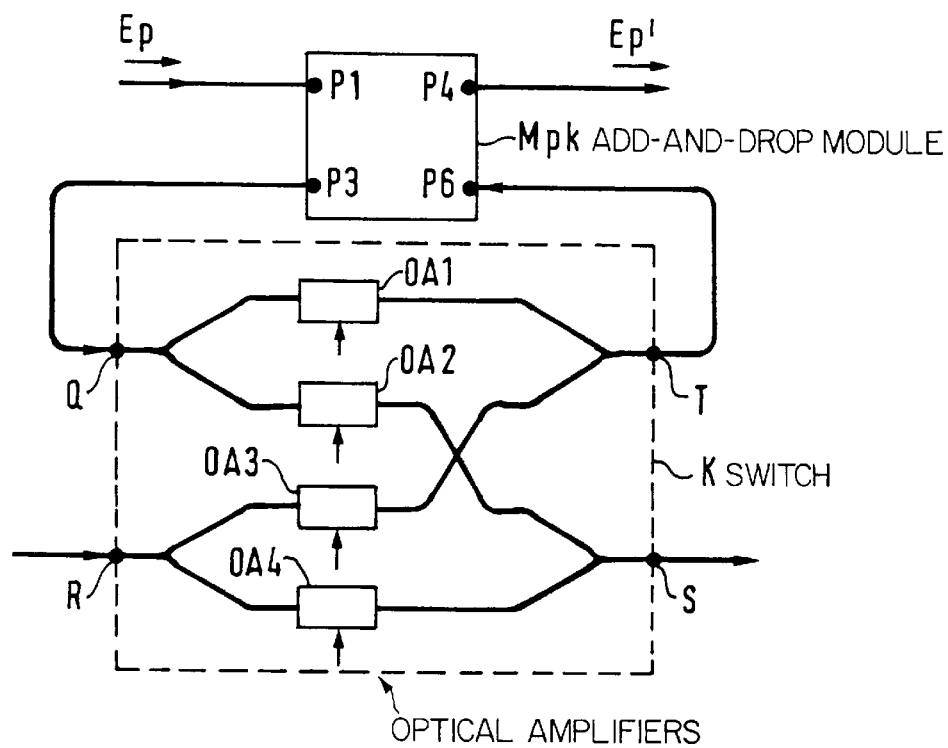
FIG. 3 shows an embodiment of the apparatus of the invention, in which a single module is used.

FIG. 3 shows apparatus of the invention in its simplest version. The above-described add-and-drop module Mpk is associated with an optical switch K provided with two inlets Q, R, and with two outlets T, S. The drop port P3 of the module Mpk is coupled to the "drop" inlet Q of the switch K. The add port P6 of the module Mpk is coupled to the "add" outlet T of the switch K. The switch K is primarily designed to be capable of selectively coupling its drop inlet Q to its add outlet T and/or to its other outlet S referred to as the "drop outlet". Furthermore, for performing the add function, the second inlet R referred to as the "add inlet", can be coupled selectively to the add outlet T. The inlet port P1 of the module Mpk is organized to receive an input multiplex Ep, while the outlet port P4 delivers an output multiplex Ep'.

As shown in FIG. 3 by way of example, the switch K is implemented by means of four optical amplifiers OA1–OA4 used as optical gates. The drop inlet Q is connected to the outlets T and S via respective amplifiers OA1 and OA2. The add inlet R is also coupled to the outlets T and S, via respective other amplifiers OA3 and OA4.

Each amplifier can be activated selectively by means of an external command (not referenced). The command may be electrical if the amplifiers are semiconductor optical amplifiers. The command may also be optical, e.g. in the form of pump waves if the amplifiers are fiber amplifiers.

The apparatus makes several operating modes possible. When the amplifier OA1 is the only active amplifier, the inlet Q and the outlet T are coupled together, thereby enabling the drop port P3 to be looped back on the add port P6 of the module Mpk. The apparatus is then transparent with respect to the input multiplex Ep. If, in addition, the second amplifier OA2 is activated, the drop inlet Q is then coupled to the drop outlet S. The apparatus then remains transparent for the multiplex Ep but it enables channels carried by wavelengths contained in the stop band of the filter to be selectively dropped. If only the amplifiers OA2 and OA3 are active, the channels reflected by the filter are dropped via the outlet S, but information dropped in this way can be modified by injecting other information carried by the stop wavelength(s) of the filter via the add inlet R. Optionally, the amplifiers OA3 and OA4 may be activated, thereby enabling new data to be added while enabling operation to be monitored by monitoring the waves transmitted via the drop outlet S.

Figure 4:
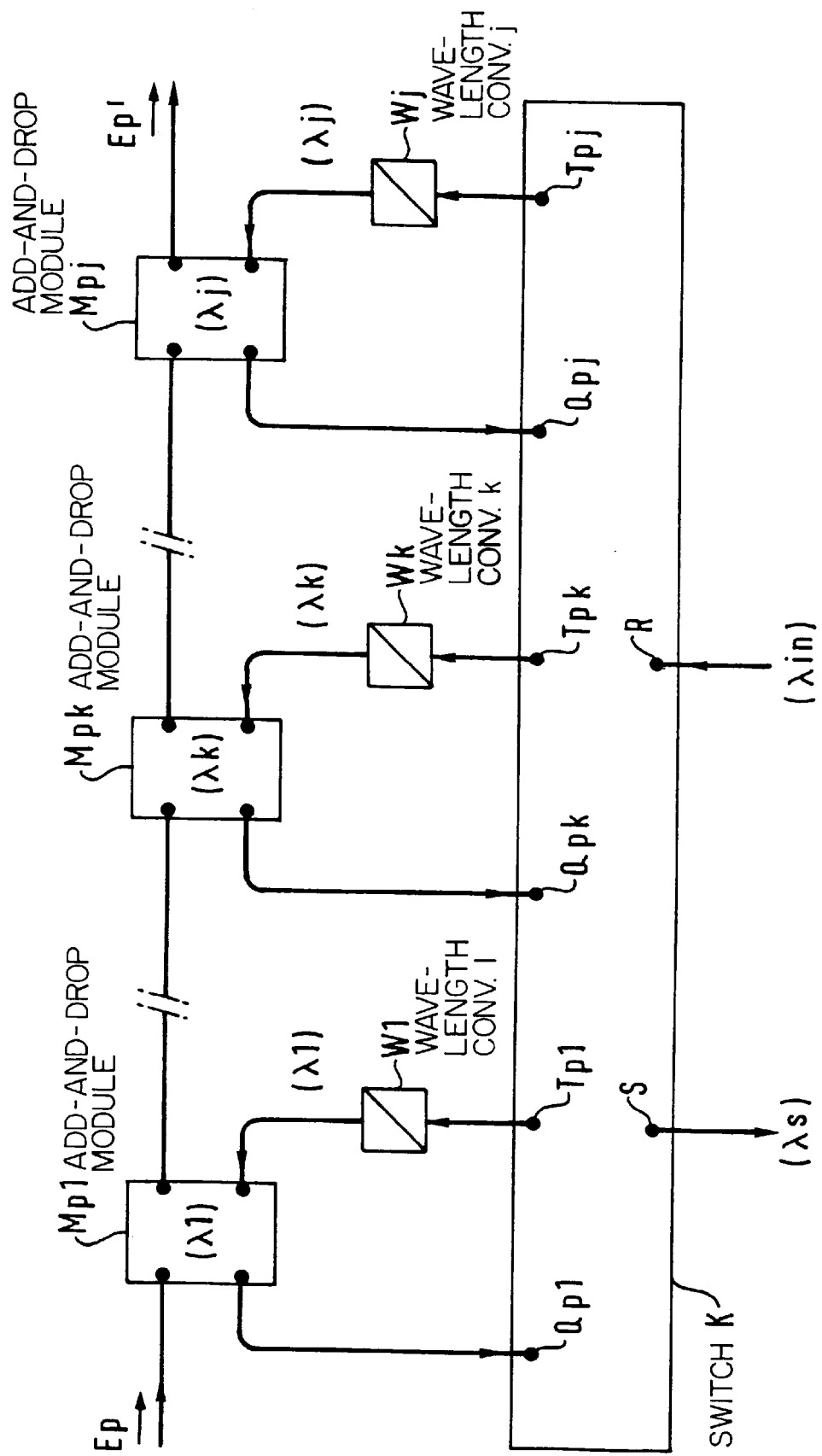
FIG. 4 shows another embodiment of the invention, in which a plurality of modules are used for the same multiplex.

In another embodiment of the invention shown in FIG. 4, a plurality of add-and-drop modules Mp1, Mpk, Mpj are provided. The modules are normally provided with filters having complementary stop bands so that, for example, the stop bands respectively contain the various wavelengths λ1, λk, λj of the carriers of the multiplex Ep.

The modules Mp1, Mpk, Mpj are connected in cascade so that the outlet port of a module is connected to the inlet port of the following module, the first module Mp1 receiving the input multiplex Ep via its inlet port, and the last module Mpj delivering the output multiplex Ep' via its outlet port.

An optical switch K is provided with a plurality of drop inlets Qp1, Qpk, Qpj respectively coupled to the drop ports of the various modules. It is also provided with a plurality of add outlets Tp1, Tpk, Tpj respectively coupled to the add ports of the modules. The switch K is finally provided with at least one drop outlet S and with at least one add inlet R.

The switch K is designed to be placed in a plurality of states enabling various operating modes to be obtained as a function of a command (not shown).

In a first mode, each drop inlet Qpk of each module Mpk is coupled to the add outlet Tpk of the same module. The apparatus is then transparent with respect to the multiplex.

In a second mode, any selected drop inlet Qpk is coupled to the outlet S, thereby enabling corresponding wavelengths λs of the input multiplex Ep to be dropped, with it being possible for the apparatus to remain transparent. If the switch is provided with a plurality of outlets S, a plurality of drop inlets Qpk, Qpj can be coupled simultaneously to a plurality of outlets S, thereby dropping a plurality of channels in parallel.

In a third mode, any channel of the multiplex can be dropped as above, but the corresponding add outlet Tpk is coupled to an add inlet R, thereby enabling the channel to be modified. If the switch is provided with a plurality of add inlets R, it is possible to couple simultaneously a plurality of add inlets R to a plurality of add outlets Tpk, and thus to modify a plurality of channels of the multiplex in parallel.

When the add outlets Tpk are coupled directly to the add ports of the modules Mpk, a channel can be added only on condition that it is carried by a wavelength λin contained in the stop band of the filter receiving it. To overcome this limitation, and in an advantageous variant shown in FIG. 4, the add outlets Tp1, Tpk, Tpj are coupled to the add ports of the corresponding modules Mp1, Mpk, Mpj via wavelength converters W1, Wk, Wj tuned to deliver respective wavelengths λ1, λk, λj contained in the stop bands of the filters of the modules. As a result, it is possible to add any channel from a signal carried by any wavelength λin. This configuration also makes another operating mode possible in which any drop inlet Qpk of one of the modules Mpk is coupled to the add outlet Tpj of another module Mpj. This operating mode thus makes it possible for a message initially carried by a first wavelength to be carried by some other wavelength at the outlet of the apparatus.

Practical implementation of the switch K poses no particular difficulties once the desired operating modes have been defined. As a explained above, it may be constituted by optical gates and by couplers in a configuration resulting from said desired operating modes.

Figure 5:
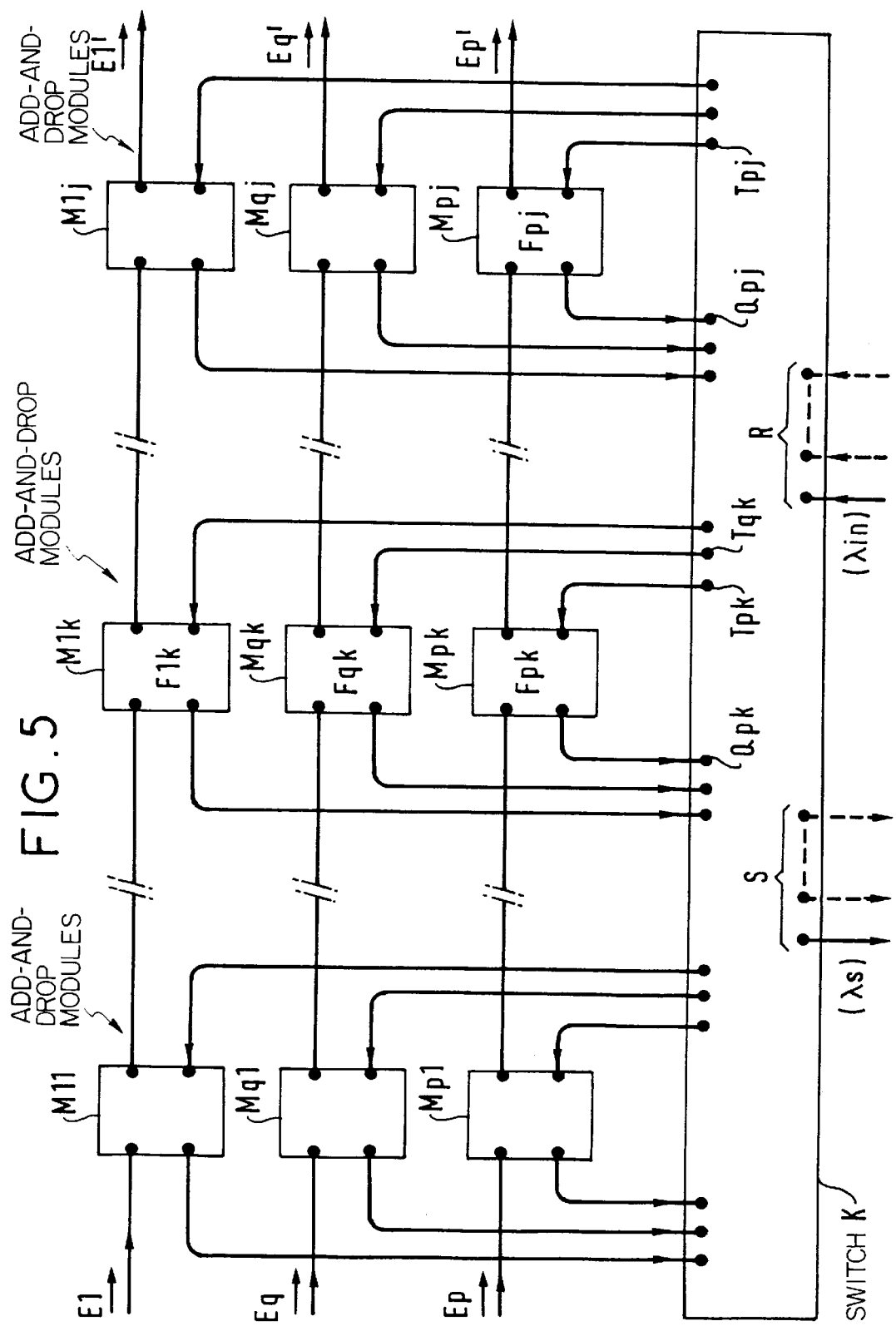
FIG. 5 shows an embodiment of the apparatus of the invention, in which a plurality of modules are used for a plurality of multiplexes.

FIG. 5 shows another embodiment of the invention enabling a plurality of multiplexes to be handled. For this purpose, for each multiplex E1, Eq, Ep, a plurality of add-and-drop modules are connected in cascade as described above. As shown, the overall apparatus may have the structure of a matrix of modules Mpk, the index p designating an associated multiplex Ep, k being representative of a stop band or wavelength of the filter of the module in question.

The associated switch K is advantageously designed to enable channels to be transferred from one multiplex to another. For example, the switch may be placed in a state in which the drop inlet Qpk associated with the module Mpk is coupled to the add outlet Tqk associated with the module Mqk. In which case, on condition naturally that the stop bands of the filters Fpk and Fqk of the modules in question overlap at least in part, it is possible to drop one or more channels from the multiplex Ep, and to add them to the multiplex Eq.

Use of the apparatus is made even easier if the add outlets Tpk are coupled to the add ports of the modules via wavelength converters as mentioned above with reference to FIG. 4. In this variant, it is possible, by giving the switch a single command, to drop any channel from one of the multiplexes and to re-insert it into another multiplex by causing it to be carried by a wavelength that is different from its original wavelength.

The invention is not limited to the above-described embodiment. In particular, the switch may be implemented by means of electromechanical control apparatus. Similarly, the add-and-drop modules may use mere couplers instead of circulators.

We claim:

1. Apparatus for selectively dropping at least one of the channels of at least one wavelength multiplex from said multiplex, said apparatus including optical switching means and, for each multiplex, at least one add-and-drop module comprising:

at least one stop filter provided with first and second opposite ports and tuned to at least one of the wavelengths of the channels of the multiplex;

inlet coupling means coupled to said first port and provided with an inlet port suitable for receiving said multiplex and with a drop port, said inlet coupling means being organized to inject into the filter at least a portion of the waves received via their inlet port, and to transmit via their drop port at least a portion of the waves received from said first port; and outlet coupling means coupled to said second port and provided with an outlet port and with an add port, said outlet coupling means being organized to inject into the filter at least a portion of the waves received via their add port, and to transmit via their outlet port at least a portion of the waves received from said second port;

and wherein said switching means are provided with at least one drop outlet and, for each module, with drop inlet coupled to said drop port, with an add outlet coupled to said add port, and wherein, for each module, said switching means are suitable for selectively coupling said drop inlet to at least one of said add outlet and to said drop outlet.

2. Apparatus according to claim 1, wherein said switching means are suitable for selectively coupling at least one drop inlet connected to one of the modules of one of the multiplexes to at least one add outlet connected to one of the modules of another multiplex.

3. Apparatus according to claim 1, wherein said switching means are provided with at least one add inlet that can be coupled selectively to at least one add outlet.

4. Apparatus according to claim 3, wherein said add inlet may be coupled selectively to said drop outlet.

5. Apparatus according to claim 1, wherein, for at least one of said multiplexes, a plurality of add-and-drop modules are connected in cascade, and are provided with respective filters having complementary stop bands.

6. Apparatus according to claim 1, including a plurality of modules associated with respective ones of a plurality of multiplexes and provided with filters having the same stop band).

7. Apparatus according to claim 1, wherein at least one of said modules has its add port connected to an add outlet via a wavelength converter delivering at least one wavelength contained in the stop band of the filter of said module.

8. Apparatus according to claim 1, wherein said inlet or outlet coupling means are circulators.

9. Apparatus according to claim 1, wherein each add-and-drop module is constituted by a wavelength-selective coupler of the type including a Bragg grating disposed in the middle of its coupling region.

* * * * *